United States Patent
Bork et al.

(10) Patent No.: US 7,870,780 B2
(45) Date of Patent: Jan. 18, 2011

(54) METHOD FOR IDENTIFYING VEHICLE WHEELS HAVING LOW TIRE PRESSURE

(75) Inventors: Andre Bork, Hannover (DE); Tobias Munko, Hannover (DE); Detlef Schmidt, Gehrden (DE)

(73) Assignee: WABCO GmbH, Hannover (DE)

( * ) Notice: Subject to any disclaimer, the term of this patent is extended or adjusted under 35 U.S.C. 154(b) by 218 days.

(21) Appl. No.: 12/316,665

(22) Filed: Dec. 15, 2008

(65) Prior Publication Data

US 2009/0173149 A1    Jul. 9, 2009

(30) Foreign Application Priority Data

Jan. 4, 2008   (DE)   ........................ 10 2008 003 192

(51) Int. Cl.
   *G01M 17/02*   (2006.01)
(52) U.S. Cl. ........................................ 73/146; 340/442
(58) Field of Classification Search ........................ None
   See application file for complete search history.

(56) References Cited

U.S. PATENT DOCUMENTS

| | | | | |
|---|---|---|---|---|
| 5,248,957 A * | 9/1993 | Walker et al. | ................ | 340/444 |
| 5,345,217 A * | 9/1994 | Prottey | ........................ | 340/442 |
| 5,721,374 A * | 2/1998 | Siekkinen et al. | .......... | 73/146.2 |
| 5,939,626 A * | 8/1999 | Tominaga et al. | .......... | 73/146.2 |
| 5,982,279 A * | 11/1999 | Tominaga et al. | ........... | 340/444 |
| 6,584,427 B2 * | 6/2003 | Kamiya et al. | .............. | 702/140 |
| 6,684,691 B1 * | 2/2004 | Rosseau | ........................ | 73/146 |
| 6,788,193 B2 * | 9/2004 | King et al. | ................... | 340/447 |
| 6,799,129 B2 | 9/2004 | Schmidt et al. | | |
| 7,069,134 B2 * | 6/2006 | Williams | ....................... | 701/79 |
| 7,146,852 B2 * | 12/2006 | Suzuki | ......................... | 73/146 |
| 7,425,892 B2 * | 9/2008 | Mori et al. | .................... | 340/442 |
| 7,546,763 B2 * | 6/2009 | Roos et al. | ..................... | 73/146 |
| 2005/0242936 A1 * | 11/2005 | Watabe | ........................ | 340/442 |

FOREIGN PATENT DOCUMENTS

DE            101 52 590 A1    10/2002

* cited by examiner

*Primary Examiner*—Lisa M Caputo
*Assistant Examiner*—Jermaine Jenkins
(74) *Attorney, Agent, or Firm*—Kramer Levin Naftalis & Frankel LLP

(57) ABSTRACT

A method for identifying low-pressure tires includes determining the number of revolutions of each wheel over a preselected driving distance, and comparing crosswise by summing the number of revolutions of the diagonally opposite front right/rear left and front left/rear right wheels and taking the difference between the sums, a diagonal containing a low-pressure tire being identifiable via the sign of the difference between the diagonals. A further comparison for each side of the vehicle is effected by summing the revolutions of the front left/rear left side and front right/rear right side wheels and comparing the difference between the sums, the side containing a low-pressure tire being identifiable via the sign of the difference between the sides. The difference between diagonals is compared with a low-pressure threshold value. If the threshold is exceeded, the signs of the difference between diagonals and between sides are logically combined to identify the low-pressure tire.

13 Claims, 1 Drawing Sheet

METHOD FOR IDENTIFYING VEHICLE WHEELS HAVING LOW TIRE PRESSURE

FIELD OF THE INVENTION

The present invention generally relates to an improved method for identifying vehicle wheels having tires impaired by low pressure.

BACKGROUND OF THE INVENTION

Tire pressure monitoring systems are increasingly being used in motor vehicles in order to improve safety. As a rule, they are direct-measuring systems equipped with pressure sensors on the wheels. This presents the disadvantage that additional pressure sensors must be built into such systems.

DE 101 52 590 A1 (see also U.S. Pat. No. 6,799,129, which is hereby incorporated by reference herein in its entirety) describes embodiments of a tire pressure monitoring system and method for vehicles equipped with anti-lock braking systems ("ABSs"), especially vehicles having more than two axles. The tire pressure monitoring system described in DE 101 52 590 A1 is equipped not only with wheel sensors on the wheels of at least one axle in order to sense variables that depend on wheel rotation, but also with an ABS control unit, which logically combines the variables with one another and evaluates them with regard to changes in the rolling radii of the wheels, taking into consideration how the variables change as a function of driving operation. The ABS unit generates a warning signal if the change of variables caused by low tire pressure exceeds a preselected limit. In addition to, or as an alternative to, wheel sensors of the ABS system, which sense variables that depend on wheel rotation, such as wheel rotation speed or distance traveled by the wheels, the absolute tire inflation pressure of the wheels of at least one axle is measured and a warning signal is generated if the measured tire inflation pressure drops below a preselected setpoint pressure. The wheel-rotation speeds or distances traveled by the individual wheels or the sums of the wheel rotation speeds or of the distances traveled by diagonally opposite wheels are compared with one another in the ABS control unit, which generates a warning signal if the difference of the mutually compared distances traveled or of the wheel rotation speeds or the difference of the mutually compared sums of the wheel rotation speeds or of the distances traveled exceeds a preselected threshold value.

SUMMARY OF THE INVENTION

Generally speaking, in accordance with the present invention, a tire pressure monitoring method is provided which improves over known methods.

In accordance with embodiments of the present invention, an improved tire pressure monitoring method includes indirect tire pressure monitoring based only on the number of wheel revolutions. This enables the identification of tires impaired by insufficient pressure without the use of additional pressure sensors.

The number of wheel revolutions for each vehicle wheel is measured over a preselected driving distance, and compared crosswise by forming the sum of the wheel revolutions of the diagonally opposite front right and rear left wheels as well as of the front left and rear right wheels and taking the difference between the summed values of the two diagonals. A diagonal containing a wheel affected by low tire pressure is identifiable based on the sign of the difference between the diagonals. The number of wheel revolutions is further compared for each side of the vehicle by forming the sum of the number of wheel revolutions of the front left and rear left side wheels as well as of the front right and rear right side wheels and comparing the difference between the summed values of the two sides. A side containing a wheel impaired by low tire pressure is identifiable based on the sign of the difference between the sides. The difference between the diagonals is compared with a low-pressure recognition threshold value and, if the threshold value is exceeded, the signs of the difference between the diagonals and of the difference between the sides are logically combined with one another to identify the vehicle wheel impaired by low tire pressure.

In lieu of the comparison of wheel revolutions for either (i) each diagonal or (ii) each side of the vehicle, or in addition to such comparisons (i) and (ii), the number of revolutions of the wheels of each axle of the vehicle can be utilized to identify low pressure vehicle tires. In a two-axle vehicle, for example, this can be accomplished by summing the number of wheel revolutions of the front left and right wheels as well as of the rear left and right wheels and taking the difference between the summed values—an axle containing a wheel impaired by low tire pressure is identifiable based on the sign of the difference between the axles.

Accordingly, it is an object of the present invention to provide an improved tire pressure monitoring method whereby the identification of vehicle tires having insufficient pressure does not require the use of pressure sensors on the wheels.

Still other objects and advantages of the present invention will in part be obvious and will in part be apparent from the specification.

The present invention accordingly comprises the several steps and the relation of one or more of such steps with respect to each of the others, and embodies features of construction, combination of elements, and arrangement of parts which are adapted to effect such steps, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawing in which.

DETAILED DESCRIPTION OF THE PREFERRED EMBODIMENTS

Figure 1:
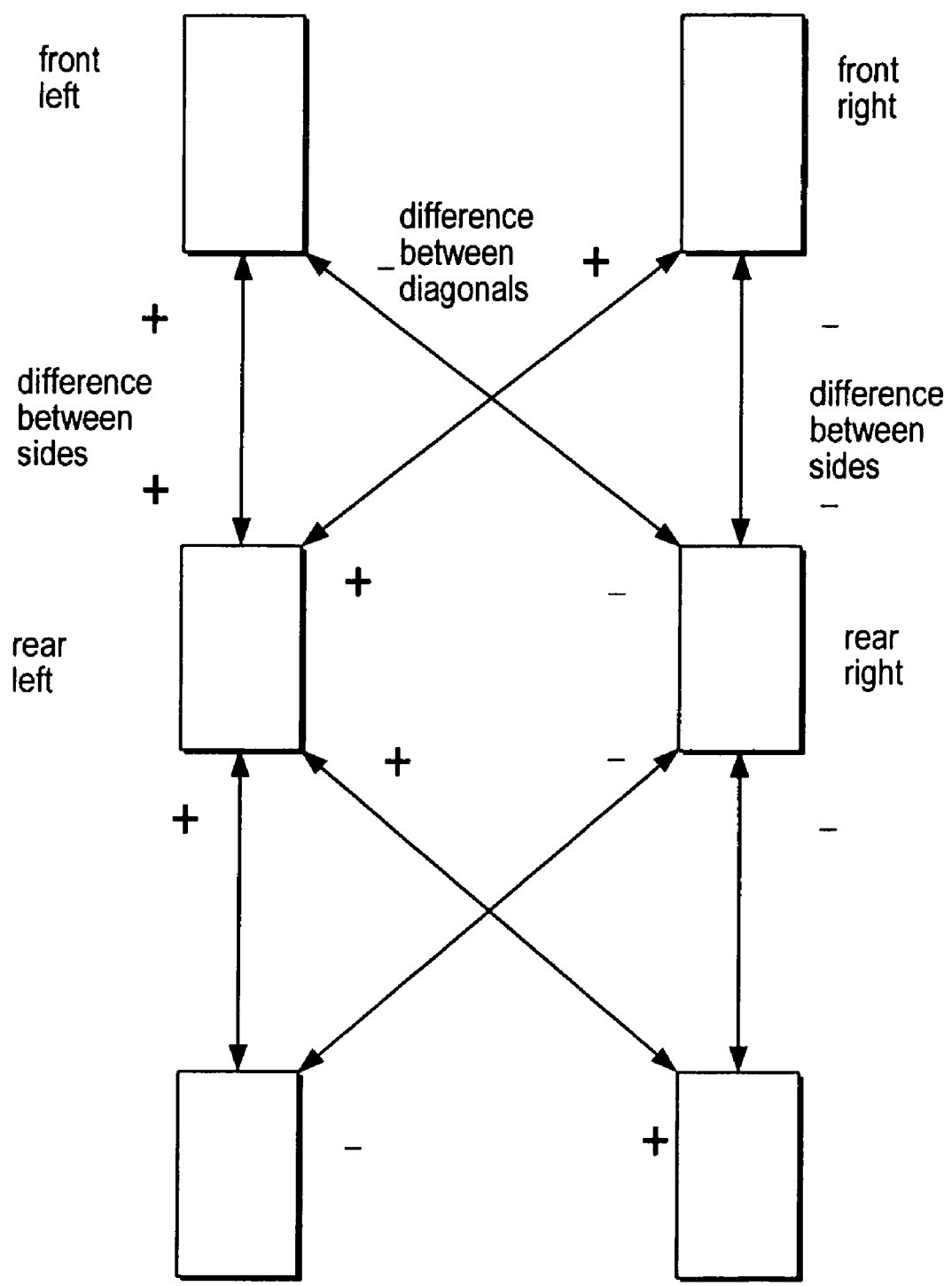
FIG. 1 is a schematic diagram illustrating logical combination of the signs of wheel revolution differences between the sides and diagonals of a vehicle having three axles in accordance with an embodiment of the method of the present invention.

The method according to embodiments of the present invention enables indirect recognition of low tire pressure. Over a preselected driving distance, the number of revolutions of each vehicle wheel is determined, preferably continuously—e.g., by counting integral and fractional rotations of the wheels or by counting suitable variables directly related thereto, such as, for example, trigger signals of ABS wheel sensors. The measured number of revolutions of the wheels is compared crosswise by summing the measured number of revolutions of the diagonally opposite front right and rear left wheels as well as the front left and rear right wheels and taking the difference between the summed values of the two diagonals. The number of wheel revolutions of a wheel having low tire pressure increases because of the decrease in circumference. The difference between the diagonals is compared with a preselected low-pressure recognition threshold value. If this threshold value is exceeded, e.g., several times consecutively, low pressure is recognized and signaled.

In addition, the affected vehicle diagonal can be identified by the sign of the difference between the diagonals. If the difference between the diagonals is formed as the sum (front/right+rear/left) sum (front/left+rear/right), a positive sign of the difference between the diagonals means that the front/right−rear/left diagonal wheels are affected, while a negative sign points to the front/left−rear/right diagonal wheels. The tires affected by low pressure can now be manually identified readily, since only two diagonal tires would have to be checked.

In order to avoid manual identification of the wheel impaired by insufficient tire pressure, a comparison of the measured number of wheel revolutions on each side of the vehicle whenever the low-pressure recognition threshold value is exceeded can be effected by summing the number of wheel revolutions of the front/left and rear/left side wheels as well as the number of wheel revolutions of the front/right and rear/right side wheels and taking the difference between the summed values of the two sides. As an example, if the difference is formed by sum (front/left+rear/left)−sum (front/right+rear/right), a positive sign of the difference value indicates that the wheels of the left side of the vehicle are affected, and a negative sign indicates that the wheels of the right side of the vehicle are affected.

Also, the wheel identification by evaluation of the difference between the sides can lead to faster manual identification, since only the wheels of one side need be checked. It should be appreciated that this achieves a gain in certainty in the case of a tire puncture at the roadside, for example.

The difference between the sides is free of drive influences. Since wheel revolutions are preferably tracked over a long distance, it can be assumed that influences due to cornering are largely canceled out, assuming that an equal number of left and right corners are negotiated, and that the result significantly indicates the side affected by low tire pressure.

By logical combination of the two pieces of information about the affected vehicle diagonal and the affected vehicle side, or in other words by logically combined evaluation of the difference between the sides and the difference between the diagonals or by logical combination of the signs of the difference between the diagonals and the difference between the sides with one another, it is possible to identify the affected wheel unambiguously.

In vehicles having more than two axles, correspondingly more differences between diagonals can be formed (between axles 1+2, axles 2+3, etc.), and the sign information about these differences can be logically combined such that even greater certainty is achieved for wheel identification.

Instead of the comparison of the number of wheel revolutions on each side, it is also possible to compare the number of wheel revolutions on each axle by summing the number of wheel revolutions of the front/left and front/right wheels as well as the number of wheel revolutions of the rear/left and rear/right wheels and taking the difference between the summed values of the two axles. By logical combination of the signs of the difference between the axles with the signs of the difference between the diagonals, unambiguous identification of the tire impaired by low pressure can also be achieved. As with the difference between the diagonals and the difference between the sides discussed above, the axle affected by the low tire pressure can also be identified from the signs of the difference between the axles.

The difference between the axles is free of cornering influences and is preferably suitable for freewheeling vehicle axles.

The logical combination of signs of differences between the sides and diagonals in a vehicle having three axles is illustrated in FIG. 1. Considering a vehicle having two axles, if the difference comprising the (front right+rear left) diagonal minus the (front left+rear right) diagonal has a positive sign and the difference comprising the (front left+rear left) side minus the (front right+rear right) side has a positive sign, the tire impaired by low pressure is the tire of the rear left wheel.

Accordingly, the present invention provides an improved tire pressure monitoring methodology which avoids the use of additional wheel pressure sensors.

It will thus be seen that the objects set forth above, among those made apparent from the preceding description, are efficiently attained, and since certain changes may be made in carrying out the above method without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for identifying vehicle wheels having low tire pressure, comprising the steps of:

determining the number of revolutions of each wheel of a vehicle over a preselected driving distance;

comparing said number of wheel revolutions crosswise by (i) summing said number of wheel revolutions of a first diagonal of opposite front right and rear left wheels and of a second diagonal of opposite front left and rear right wheels, and (ii) calculating a first difference between the sums of said number of wheel revolutions of said first and second diagonals;

identifying at least one of said first and second diagonals as containing a wheel affected by low tire pressure based on the sign of said first difference;

comparing said number of wheel revolutions of each side of said vehicle by (iii) summing said number of wheel revolutions of a first side of said front left and rear left wheels and of a second side of said front right and rear right wheels, and (iv) calculating a second difference between the sums of said number of wheel revolutions of said first and second sides; and identifying at least one of said first and second sides as containing a wheel affected by low tire pressure based on the sign of said second difference.

2. The method according to claim 1, wherein said step of determining said number of revolutions of each vehicle wheel is effected continuously over said preselected driving distance.

3. The method according to claim 1, further comprising the steps of comparing said first difference against a preselected low-pressure recognition threshold value and, when said first difference exceeds said low-pressure recognition threshold value, logically combining the sign of said first difference and the sign of said second difference to identify at least one of said vehicle wheels affected by low tire pressure.

4. A method for identifying vehicle wheels having low tire pressure, comprising the steps of:

determining the number of revolutions of each wheel of a vehicle over a preselected driving distance;

comparing said number of wheel revolutions crosswise by (i) summing said number of wheel revolutions of a first diagonal of opposite front right and rear left wheels and of a second diagonal of opposite front left and rear right wheels, and (ii) calculating a first difference between the sums of said number of wheel revolutions of said first and second diagonals;

identifying at least one of said first and second diagonals as containing a wheel affected by low tire pressure based on the sign of said first difference;

comparing said number of wheel revolutions of each axle of said vehicle by (iii) summing said number of wheel revolutions of a first axle including said front left and front right wheels and of a second axle including said rear left and rear right wheels, and (iv) calculating a second difference between the sums of said number of wheel revolutions of said first and second axles; and identifying at least one of said first and second axles as containing a wheel affected by low tire pressure based on the sign of said second difference.

5. The method according to claim 4, wherein said step of determining said number of revolutions of each vehicle wheel is effected continuously over said preselected driving distance.

6. The method according to claim 4, further comprising the steps of comparing said first difference against a preselected low-pressure recognition threshold value and, when said first difference exceeds said low-pressure recognition threshold value, logically combining the sign of said first difference and the sign of said second difference to identify at least one of said vehicle wheels affected by low tire pressure.

7. A method for identifying vehicle wheels having low tire pressure, comprising the steps of:

determining the number of revolutions of each wheel of a vehicle over a preselected driving distance;

comparing said number of wheel revolutions crosswise by (i) summing said number of wheel revolutions of a first diagonal of opposite front right and rear left wheels and of a second diagonal of opposite front left and rear right wheels, and (ii) calculating a first difference between the sums of said number of wheel revolutions of said first and second diagonals;

identifying at least one of said first and second diagonals as containing a wheel affected by low tire pressure based on the sign of said first difference;

comparing said number of wheel revolutions of each side of said vehicle by (iii) summing said number of wheel revolutions of a first side of said front left and rear left wheels and of a second side of said front right and rear right wheels, and (iv) calculating a second difference between the sums of said number of wheel revolutions of said first and second sides;

identifying at least one of said first and second sides as containing a wheel affected by low tire pressure based on the sign of said second difference;

comparing said number of wheel revolutions of each axle of said vehicle by (v) summing said number of wheel revolutions of a first axle including said front left and front right wheels and of a second axle including said rear left and rear right wheels, and (vi) calculating a third difference between the sums of said number of wheel revolutions of said first and second axles; and identifying at least one of said first and second axles as containing a wheel affected by low tire pressure based on the sign of said third difference.

8. The method according to claim 7, wherein said step of determining said number of revolutions of each vehicle wheel is effected continuously over said preselected driving distance.

9. The method according to claim 7, further comprising the steps of comparing said first difference against a preselected low-pressure recognition threshold value and, when said first difference exceeds said low-pressure recognition threshold value, logically combining the sign of said first difference and at least one of the sign of said second difference and the sign of said third difference to identify at least one of said vehicle wheels affected by low tire pressure.

10. The method according to claim 7, further comprising the step of logically combining the sign of said third difference and at least one of the sign of said second difference and the sign of said first difference to identify at least one of said vehicle wheels affected by low tire pressure.

11. A method for identifying vehicle wheels having low tire pressure, comprising the steps of:

determining the number of revolutions of each wheel of a vehicle over a preselected driving distance;

comparing said number of wheel revolutions of each side of said vehicle by (i) summing said number of wheel revolutions of a first side of front left and rear left wheels and of a second side of front right and rear right wheels, and (ii) calculating a first difference between the sums of said number of wheel revolutions of said first and second sides;

identifying at least one of said first and second sides as containing a wheel affected by low tire pressure based on the sign of said first difference;

comparing said number of wheel revolutions of each axle of said vehicle by (iii) summing said number of wheel revolutions of a first axle including said front left and front right wheels and of a second axle including said rear left and rear right wheels, and (iv) calculating a second difference between the sums of said number of wheel revolutions of said first and second axles; and identifying at least one of said first and second axles as containing a wheel affected by low tire pressure based on the sign of said second difference.

12. The method according to claim 11, wherein said step of determining said number of revolutions of each vehicle wheel is effected continuously over said preselected driving distance.

13. The method according to claim 11, further comprising the step of logically combining the sign of said first difference and the sign of said second difference to identify at least one of said vehicle wheels affected by low tire pressure.

* * * * *